(12) United States Patent
Bahl et al.

(10) Patent No.: US 8,041,815 B2
(45) Date of Patent: Oct. 18, 2011

(54) SYSTEMS AND METHODS FOR MANAGING NETWORK CONNECTIVITY FOR MOBILE USERS

(75) Inventors: Paramvir Bahl, Issaquah, WA (US); Allen K. L. Miu, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 2664 days.

(21) Appl. No.: 09/960,258

(22) Filed: Sep. 21, 2001

(65) Prior Publication Data

US 2003/0061363 A1 Mar. 27, 2003

(51) Int. Cl.
*G06F 15/173* (2006.01)

(52) U.S. Cl. ........ 709/225; 709/226; 709/227; 709/232; 455/515

(58) Field of Classification Search .......... 455/515, 455/426.1, 435.1, 448; 709/225, 226, 227, 709/232

See application file for complete search history.

(56) References Cited

U.S. PATENT DOCUMENTS

| | | | |
|---|---|---|---|
| 5,519,706 A * | 5/1996 | Bantz et al. | 455/435.2 |
| 5,812,949 A * | 9/1998 | Taketsugu | 455/439 |
| 5,848,233 A | 12/1998 | Radia et al. | |
| 5,884,024 A | 3/1999 | Lim et al. | |
| 5,922,049 A | 7/1999 | Radia et al. | |
| 6,073,016 A * | 6/2000 | Hulthen et al. | 455/435.2 |
| 6,163,843 A | 12/2000 | Inoue et al. | |
| 6,374,108 B1 * | 4/2002 | Jakobsen et al. | 455/432.1 |
| 6,487,406 B1 * | 11/2002 | Chang et al. | 455/422.1 |
| 6,516,191 B1 * | 2/2003 | Greenspan et al. | 455/412.1 |
| 6,671,735 B1 * | 12/2003 | Bender | 709/238 |
| 6,731,621 B1 * | 5/2004 | Mizutani et al. | 370/338 |
| 6,742,036 B1 * | 5/2004 | Das et al. | 709/226 |
| 6,763,007 B1 * | 7/2004 | La Porta et al. | 370/331 |
| 6,845,094 B1 * | 1/2005 | Zhang | 370/349 |
| 6,864,341 B2 * | 3/2005 | Lai et al. | 528/43 |
| 6,877,104 B1 * | 4/2005 | Shimono | 714/4 |
| 7,185,360 B1 | 2/2007 | Anton, Jr. et al. | |

OTHER PUBLICATIONS

Atkinson, "IP Authentication Header", retrieved on Aug. 19, 2009 at <<http://www.faqs.org/ftp/rfc/pdf/rfc1826.txt.pdf>>, Network Working Group, RFC 1826, Aug. 1995, pp. 1-13.

Atkinson, "IP Encapsulating Security Payload (ESP)", retrieved on Aug. 19, 2009 at <<http://www.faqs.org/ftp/rfc/pdf/rfc1827.txt.pdf>>, Network Working Group, RFC 1827, Aug. 1995, pp. 1-12.

(Continued)

*Primary Examiner* — Ramsey Refai
(74) *Attorney, Agent, or Firm* — Lee & Hayes, PLLC

(57) ABSTRACT

Systems and methods are described for managing network connectivity for mobile users, particularly when a mobile user roams between two networks or between two subnets of a network. An announcer signal is broadcast by a host organization. The announcer signal includes a network identifier, an authorizer address and a verifier address. A mobile client monitors for the announcer signal and, when detected, provides an option to connect to the network via the authorizer. Once authorization is obtained, the mobile client communicates with the network through the verifier. The verifier received tagged data packets from a mobile client and only accepts the data packets if a valid tag (created with an authorization key) is included therewith. Multiple verifiers may be used to provide load balancing and fault tolerance (in the event a verifier fails). If a mobile client disconnects from a network and later reconnects, the mobile client does not have to be re-authorized if the mobile client still has a valid authorization key.

21 Claims, 11 Drawing Sheets

OTHER PUBLICATIONS

Atkinson, "Security Architecture for the Internet Protocol", retrieved on Aug. 19, 2009 at <<http://www.faqs.org/ftp/rfc/pdf/rfc1825.txt.pdf>>, Network Working Group, RFC 1825, Aug. 1995, pp. 1-22.

Droms, "Authentication of DHCP Messages", Cisco Systems, Jun. 2001, 17 pages.

Droms, "Dynamic Host Configuration Protocol", Bucknell University, Published Mar. 1997, 45 pages.

Gulbrandsen, et al., "A DNS RR for specifying the location of services (DNS SRV)", retrieved on Aug. 19, 2009 at <<http://www.faqs.org/ftp/rfc/pdf/rfc2052.txt.pdf>>, RFC 2052, Oct. 1996, pp. 1-10.

Karn, et al., "The EEP DES-CBC Transform", retrieved on Aug. 19, 2009 at <<http://www.faqs.org/ftp/rfc/pdf/rfc1829.txt.pdf>>, Network Working Group, RFC 1829, Aug. 1995, p. i and pp. 1-10.

"Linksys Etherfast Cable/DSL Router User Guide", Linksys, 2000, 26 pages.

Metzger, et al., "IP Authentication using Keyed MD5", retrieved on Aug. 19, 2009 at <<http://www.faqs.org/ftp/rfc/pdf/rfc1828.txt.pdf>>, Network Working Group, RFC 1828, Aug. 1995, p. i and pp. 1-5.

Patrick, "DHCP Relay Agent Information Option", Motorola BCS, Published Jan. 2001, 14 pages.

Privat, et al., "DHCP Next Server Option", retrieved on Aug. 19, 2009 at <<http://tools.ietf.org/id/draft-ietf-dhe-nextserver-02.txt>>, Internet Engineering Task Force, Mar. 2000, 10 pages.

"Secondary name servers—how to be a backup DNS for someone else", retrieved on Aug. 19, 2009 at <<http://www.freebsddiary.org/secondary.php>>, Dec. 1998, pp. 1-5.

\* cited by examiner

| Network ID 502 | Subnet Mask 508 | Authorizer Address 504 | Verifier Address 506 | Website URL 510 |

Extended Announcer Signal
500

Fig. 5

Announcer Signal With Load Balancing Feature
700

Announcer Signal
800

FAULT TOLERANCE

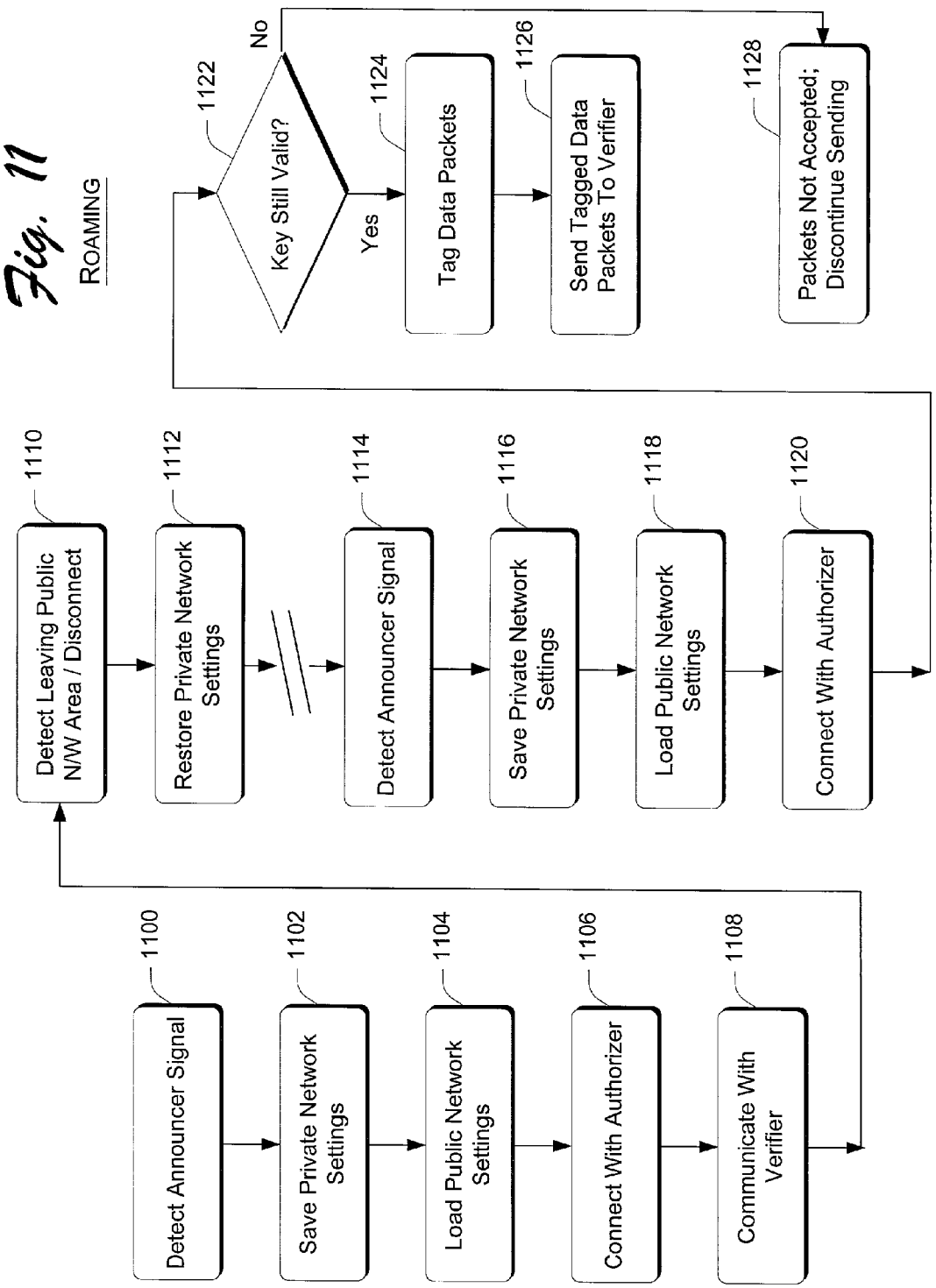

SYSTEMS AND METHODS FOR MANAGING NETWORK CONNECTIVITY FOR MOBILE USERS

TECHNICAL FIELD

The present invention relates to accessing wireless networks. In particular, the invention relates to systems and methods for managing network connectivity for mobile users.

BACKGROUND

The growth and popularity of the Internet has created an economy and society where businesses and individuals rely heavily on having connectivity to the Internet. In addition to the proliferation of private networks that can be accessed from homes and business, this has led to the creation of public networks that are located and accessible in public places, such as shopping malls, airports, libraries, etc. Public networks provide Internet access to mobile users in areas frequented by users but not traditionally configured to provide Internet access.

The usage and service options of a public network generally differ from that of a private (enterprise or home) network. Consequently, the two networks are often configured differently and computers accessing the networks must accommodate the different configurations to allow users to move easily between a private network and a public network.

Large corporations tend to be extremely security cautious, taking an enterprise-centric approach where every user is governed by a single policy. User authentication is intended to prevent unknown persons from accessing internal private networks. Such corporations generally use some sort of a preconfigured shared key mechanism with hardware encryption to secure network access.

Public networks are security cautious only to the extent that the individual using the network is. The host organization's focus is on establishing the identity of a previously unknown user and then giving her access to the network, its resources, and other location services. Hence, tracking who is using the network, what services are being used and how much bandwidth is being used are important. Public networks typically perform packet-level processing for both user-level authentication and privacy, and for offering different kinds of services, and keeping track of network use on a per-user basis.

Another difference is, while corporations generally have a high level of confidence and trust in their user (employees), public network operators have to guard against the network users who they might not know well. They need tools to protect themselves from malicious users who are only interested in bringing the network down.

Consequently, client devices have to change behavior according to the network being accessed. When accessing a private network, the client need not do anything; hardware encryption with a shared key is sufficient to control users' access. However, when accessing a public network, the client runs through an authentication process and starts using a specialized network access protocol, which gets it different types of interesting services.

The mobility problem can be further expressed in a few different scenarios:

1. The mobile client migrates between a private (company) network and a public network. Since the company network may not be running a system that is compatible with the public network, the mobile client must recognize when to enable/disable the public network protocol locally.

2. The mobile client migrates between different subnets of the same public network. In this case, it is undesirable to require the user to re-authenticate herself by repeating the logon process. Instead, the client should gain access in the new subnet by using the same key obtained from the previous subnet. The mobile client must recognize and perform any necessary changes in the routing configuration (e.g., directing traffic to a different verifier server) and resume network operation by using the same key.

3. The mobile client migrates between different public networks. The mobile client must distinguish this from the previous scenario and ask the user to perform the logon process in the new network. After authentication has succeeded, the client host will use a new key to communicate in the new network. However, the mobile client should save the previous key until it expires so that it could be reused upon returning to the previous network.

There exists a need for a mobility support mechanism that allows devices to automatically determine how to establish/re-establish network connectivity as roaming users migrate across the different networks.

SUMMARY

Various implementations for accommodating mobile connectivity between networks are described. In particular, implementations for accommodating mobile connectivity between private and public networks are shown. In the described implementations, the public network is a wireless network. The private network in the described implementations may be wired or wireless.

In one implementation, a public network architecture is provided, by one or more host organizations, for providing individuals with wireless access to the Internet. The public network architecture includes a global authentication server and at least one authorizer. The networks are advantageously deployed in public areas such as airports, shopping malls, libraries, etc. The host organization may partition this network either physically, or logically, into several smaller networks called subnets. Each subnet includes at least one verification server ("verifier").

The announcer broadcasts an announcer signal that identifies the network, as well as the network addresses of the authorizer and the verifier. A daemon process on a mobile client is configured to monitor for the announcer signal. When detected, the mobile client contacts the authorizer by way of an Access Point to obtain authorization to access the network.

Upon authorization by the authorizer, the mobile client receives an authorization key that indicates that the mobile user has been authorized to access the network. In one implementation, the authorization key includes an expiration time, after which the authorization key is invalid. After obtaining the authorization key, the mobile user communicates with the network by transmitting data packets through the verifier. The verifier verifies that each data packet received from a client is authorized to access the network, i.e., the verifier checks the data packet for a tag created by a valid authorization key. Data packets containing an appropriate tag are passed on to the network; data packets having an invalid tag are denied.

A network may include more than one verifier. This feature of the described implementations provide scalability to the architecture, since a small network may have one verifier, while a larger network may have ten, twenty or more verifiers.

The more verifiers utilized in a network, the higher the traffic load the network can accommodate.

Multiple verifiers may also be used to provide load balancing and fault tolerance to a system. In one implementation wherein multiple verifiers are utilized, load balancing is accomplished by monitoring the traffic load on each verifier. Since new connections are directed to a verifier that is identified in the announcer signal, when a load on that verifier attains a load threshold, the announcer signal is changed to identify an alternate verifier that has a lower load. If that alternate verifier reaches the load threshold, the announcer signal may be altered again to identify yet another alternate verifier. In this manner, the traffic on the network may be spread out among all the verifiers utilized in the network.

Utilization of multiple verifiers also provides a fault tolerance mechanism for the network. If a preferred verifier—i.e., a verifier that is identified in the announcer signal—fails, then mobile clients using the failed verifier detect that the verifier has failed, and re-direct data packets to an alternate verifier. In another implementation, the announcer signal is changed to reflect a new verifier when the server system detects a verifier failure. The alternate verifier may be previously identified to be a backup verifier for the preferred verifier, or the system may dynamically select an available verifier to use as the alternate verifier. Mobile clients that are currently communicating with the network through the preferred verifier will detect an announcer signal that contains a new address for a preferred verifier (the alternate verifier). Data packets are re-directed to the alternate verifier (the new preferred verifier).

In one implementation, mobile clients that roam from one Access Point on a network to another Access Point on the same network can reconnect to the network without having to go through the authentication process again. For example, a client that connects to a public network at SEATAC airport in Seattle while waiting for a flight to Chicago may disconnect from the network, catch the flight to Chicago, and reconnect to the same public network at O'Hare airport. The client accomplishes this by using the same authorization key that was obtained at SEATAC when the client reconnects at O'Hare. The authorizer in Chicago will recognize that the client has a valid authorization key and will allow the client to bypass the authentication process and go directly to a verifier associated with the O'Hare system. If an expiration time is used with the authorization key, the client will only be able to bypass authentication only if the authorization key has not expired.

In another implementation, if a mobile client contains network settings from a private network, or some other previous network, the private network settings are stored when the public network is detected and accessed. When the mobile client disconnects from the public network, e.g., the mobile client leaves the public network coverage area, then the private network settings are restored. When the private network is subsequently accessed, the mobile client will be configured correctly.

BRIEF DESCRIPTION OF THE DRAWINGS

FIG. 5 is a diagram of an exemplary extended announcer signal.

FIG. 11 is a flow diagram depicting a method for managing network connectivity for mobile users.

DETAILED DESCRIPTION

Overview

In the described embodiments, systems and methods are provided for accommodating mobile connectivity between networks, e.g. private networks and public networks. Mobile users are provided with the capability to automatically detect the presence of a wireless network and to automatically change settings from a previous network to connect to the wireless network.

An announcer beacon broadcasts an announcer signal that includes a network identifier, an authorizer identifier and a verifier identifier. The mobile client detects the announcer signal and obtains the information contained therein. The mobile client contacts the authorizer at the address received from the signal to obtain authorization to access the network. If the client is authorized, the authorizer transmits an authorization key to the client. On subsequent data packet transmissions to the verifier, the client attaches a tag created with the authorization key to each data packet. The verifier accepts data packets having a valid tag but denies data packets that do not have a valid tag.

The claimed invention includes other features and aspects that will be discussed in greater detail below.

Figure 1:
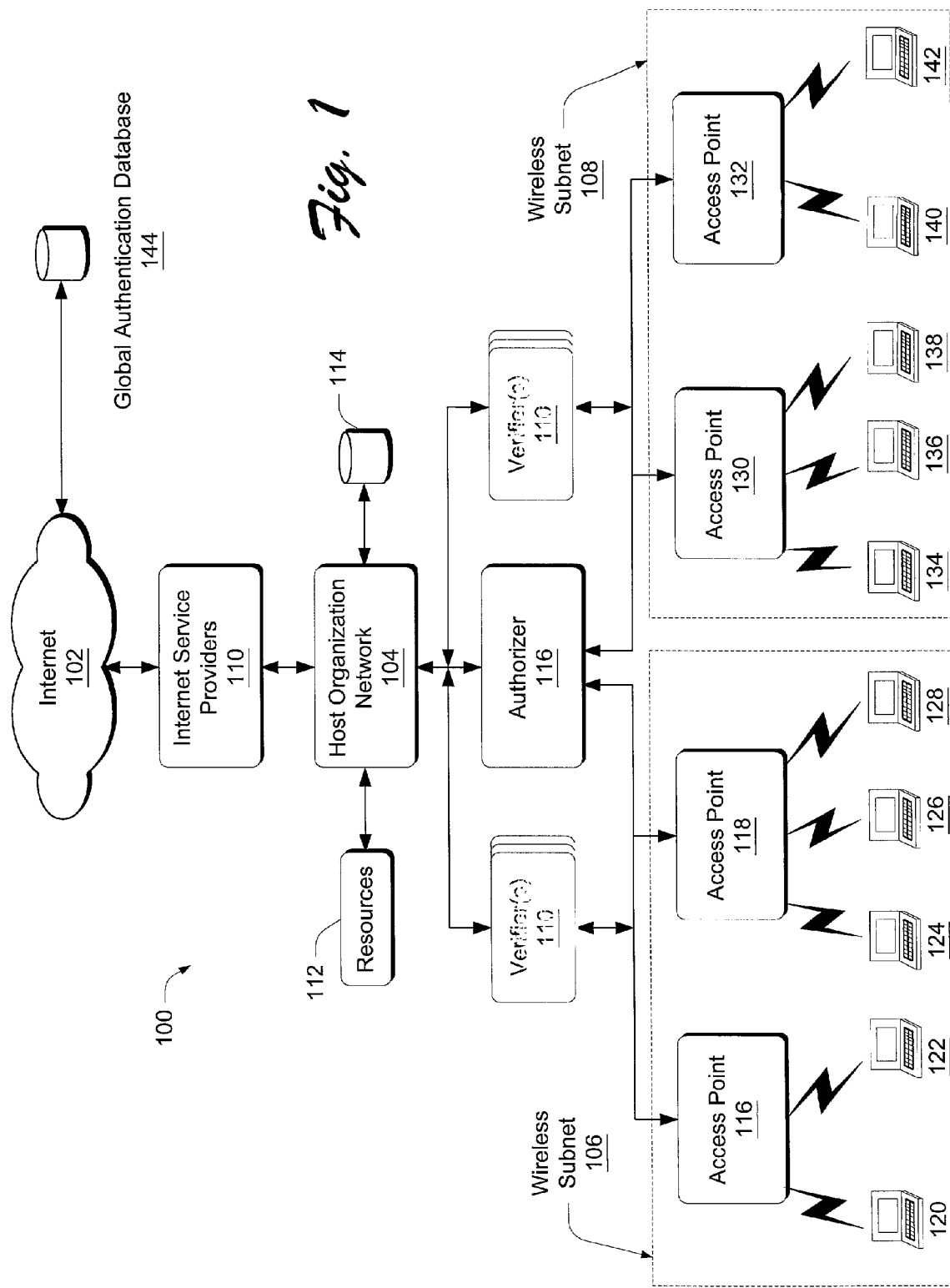
FIG. 1 is a high level system diagram of an exemplary system architecture in accordance with a described implementation.

FIG. 1 shows a high level system diagram of an exemplary system architecture generally at 100 that is capable of implementing various features described below. Architecture 100 is used in connection with a computer network an exemplary one of which is the Internet 102. One or more host organization networks 104 are provided and are managed by a host organization (not shown). Examples of a host organization include individual businesses that might, for example, be located in a public area. Although there may be more than one host organization network, only one host organization network 104 is shown in the present example. Exemplary public areas include shopping malls, libraries, airports, downtown shopping areas and the like. The host organization 104 includes one or more wireless subnets (wireless subnet 106 and wireless subnet 108 in the present example). Each wireless subnet 106, 108 may be located in a different public area. For example, wireless subnet 106 might be located in a shopping mall, while wireless subnet 108 might be located in an airport. One or more service providers 110 can be incorporated in the architecture 100. In this example, the service providers 110 control access to the Internet 102 and comprise a plurality of different Internet Service Providers (ISPs) that are communicatively linked with the host organization network 104. The host organization network 104 can include one or more resources 112. Exemplary resources can include, without limitation, scanners, tape drives, laser printers, and the like. Each host organization network 104 might also include a local authentication database 114 for purposes that will be described below.

Wireless subnet 106 is shown having Access Point 116 and Access Point 118. Mobile clients 120, 122 are shown communicating with the host organization network 104 through Access Point 116. Mobile clients 124, 126, 128 are shown communicating with the host organization network 104 through Access Point 118.

Wireless subnet 108 is shown having Access Point 130 and 132. Mobile clients 134, 136, 138 are shown communicating with the host organization network 104 through Access Point 130. Mobile clients 140, 142 are shown communicating with the host organization network 104 through Access Point 132.

It is noted that wireless subnets 106, 108 or other subnets (not shown) may provide a greater or lesser number of Access Points than shown in FIG. 1. Also, a greater or lesser number of mobile clients than shown may be connecting with the Access Points.

Architecture 100 can also include a global authentication database 144 that is configured to be globally accessible from anywhere in the world. In the illustrated example, the global authentication database 144 includes not only a repository of data or information that is used to authenticate users, but also any information regarding server computers or computing devices that are used in connection with the data repository to authenticate a user. The global authentication database 144 is advantageously accessible via the Internet 102. The global authentication database 144 can be any suitable globally accessible database that is capable of authenticating users as described below. Such databases can be operated by and/or associated with particular businesses, organizations or clubs for which authentication is desired. For example, a particular organization, e.g., Gold Club Frequent Fliers, may have negotiated with authorizer 116 for Internet access for its members. When the members access the network 104 through wireless subnet 106, there needs to be a way to authenticate these Gold Club Frequent Flyer members so that they can be provided Internet access at the negotiated level. The global authentication database 144 provides a mechanism by which this can be done, as will become apparent below. Alternately, the global authentication database 144 can be a more generalized database that can be operated on behalf of many organizations or businesses that might want to generally authenticate users. An example of this type of global authentication database is MICROSOFT PASSPORT Server and database. The MS server and database enable a user to be individually verified against information that is maintained by the server and database. Often times, this type of verification is conducted outside of the purview of other servers in an end-to-end secure fashion.

In the illustrated example, users can access the Internet through the use of a client computer or other computing device. In the context of this document, a "user" refers to a human individual and a "client" refers to a computer or computing device that the human individual uses to access the Internet. The client can be a mobile computer such as a lap top computer, or can be any other suitable computing device. The client can be provided by the host organization, or can be a mobile computing device that travels with its particular user. When a user wishes to access the Internet, they simply use their client computer to interface with a wireless subnet 106, 108. The wireless subnets 106, 108 provide means for communicating with the authorizer 116 and verifier 110. The authorizer 116 first authenticates the user by using one of the local or global authentication databases 114, 144 respectively.

In the described embodiment, after a user has been authorized by the authorizer 116, the user thereafter communicates with the host organization network 104 through one or more of the verifiers 110. This permits the authorizer 116 to be a dedicated server that only performs authorization. Consequently, the verifiers 110 are not required to perform authorizations, but can simply allow access to the host organization network 104 as long as data packets transmitted through the verifiers 110 can provide proof that the user sending the data packets has already been authorized access to the host organization network 104 by the authorizer 116.

In at least one embodiment, the authorizer 116 contains sufficient information to authorize users locally, i.e., by using the local authorization database 114. Periodic downloads of user data from the global authorization database 144 is one way that may be used to widen the scope of users that can be authorized locally. However, it may be desirable for the authorizer 116 to communicate with the global authorization database 144 to authorize users.

In one or more embodiments, limited access to the Internet can be granted by the authorizer 116 for the limited purpose of authenticating a user via the global authorization database. After a limited period of time, if the user has not been authenticated, Internet access can be terminated. For example, an IP address might be temporarily granted to a user via a DHCP or NAT process. If the user has not authenticated themselves within a definable period of time (e.g., ten minutes), their Internet access can be terminated. The global authentication database 114 takes the user through a separate authentication process (e.g., entry of a user name and password) so that the user can be authenticated to the global authentication database 114. This authentication process can be a protected end-to-end secure process in which all of the user's transmissions to the global authentication database 114 are encrypted from the client machine and can be only decrypted by the global authentication database 114. An exemplary encryption technique is Secure Socket Layer (SSL) transmission, however, other secure techniques can be used. The communications are secure between the authorizer 116, the host organization network 104 and the global authorization database 144.

Once the user is authenticated to the global authentication database 114, the database 114 generates a message to the host organization network 104 and informs the host organization network 104 that the particular user has been authenticated. After the authentication has occurred, all communication with and access to the Internet 102 takes place through one or more of the verifiers 110. That is, all of the data packets that are transmitted from and received by the client are routed through the verifiers 110.

An advantageous feature of the above architecture is that it enables a user to freely move about from host organization to host organization, without having their Internet access inextricably tied to any one particular ISP or to a particular company such as their employer. This system permits a much more individual centric system that promotes user mobility, as will become apparent below. Another advantage of this architecture is that once a user is authenticated, they can move freely about without having to re-authenticate themselves to the system. Another advantageous feature of the above architecture is that a mobile client may roam between networks while providing seamless operation for a user.

Exemplary Computer System

Figure 2:
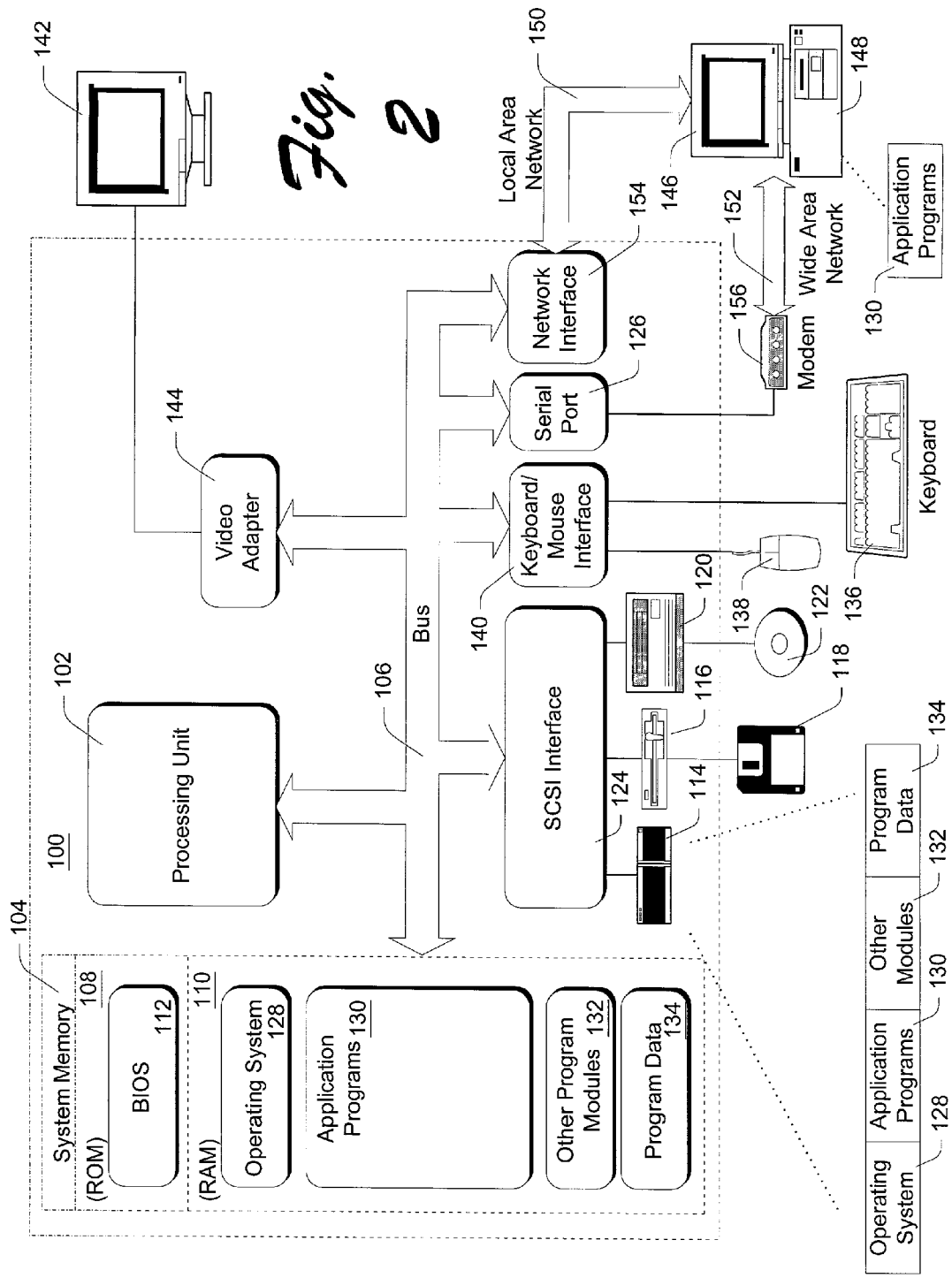
FIG. 2 is a diagram of a computer system that can be used to implement various aspects of various implementations.

FIG. 2 shows an exemplary computer system that can be used to implement various computing devices, i.e. client computers, servers and the like, in accordance with the described embodiments.

Computer 200 includes one or more processors or processing units 202, a system memory 204, and a bus 206 that couples various system components including the system memory 204 to processors 202. The bus 206 represents one or more of any of several types of bus structures, including a memory bus or memory controller, a peripheral bus, an accelerated graphics port, and a processor or local bus using any of a variety of bus architectures. The system memory 204 includes read only memory (ROM) 208 and random access memory (RAM) 210. A basic input/output system (BIOS) 212, containing the basic routines that help to transfer information between elements within computer 200, such as during startup, is stored in ROM 208.

Computer 200 further includes a hard disk drive 214 for reading from and writing to a hard disk (not shown), a magnetic disk drive 216 for reading from and writing to a removable magnetic disk 218, and an optical disk drive 220 for reading from or writing to a removable optical disk 222 such as a CD ROM or other optical media. The hard disk drive 214, magnetic disk drive 216, and optical disk drive 220 are connected to the bus 206 by an SCSI interface 224 or some other appropriate interface. The drives and their associated computer-readable media provide nonvolatile storage of computer-readable instructions, data structures, program modules and other data for computer 200. Although the exemplary environment described herein employs a hard disk, a removable magnetic disk 218 and a removable optical disk 222, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 214, magnetic disk 218, optical disk 222, ROM 208, or RAM 210, including an operating system 228, one or more application programs 230, other program modules 232, and program data 234. A user may enter commands and information into computer 200 through input devices such as a keyboard 236 and a pointing device 238. Other input devices (not shown) may include a microphone, joystick, game pad, satellite dish, scanner, or the like. These and other input devices are connected to the processing unit 202 through an interface 240 that is coupled to the bus 206. A monitor 242 or other type of display device is also connected to the bus 206 via an interface, such as a video adapter 244. In addition to the monitor, personal computers typically include other peripheral output devices (not shown) such as speakers and printers.

Computer 200 commonly operates in a networked environment using logical connections to one or more remote computers, such as a remote computer 246. The remote computer 246 may be another personal computer, a server, a router, a network PC, a peer device or other common network node, and typically includes many or all of the elements described above relative to computer 200, although only a memory storage device 248 has been illustrated in FIG. 2. The logical connections depicted in FIG. 2 include a local area network (LAN) 250 and a wide area network (WAN) 252. Such networking environments are commonplace in offices, enterprise-wide computer networks, intranets, and the Internet.

When used in a LAN networking environment, computer 200 is connected to the local network 250 through a network interface or adapter 254. When used in a WAN networking environment, computer 200 typically includes a modem 256 or other means for establishing communications over the wide area network 252, such as the Internet. The modem 256, which may be internal or external, is connected to the bus 206 via a serial port interface 226. In a networked environment, program modules depicted relative to the personal computer 200, or portions thereof, may be stored in the remote memory storage device. It will be appreciated that the network connections shown are exemplary and other means of establishing a communications link between the computers may be used.

Generally, the data processors of computer 200 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Authorization

Figure 3:
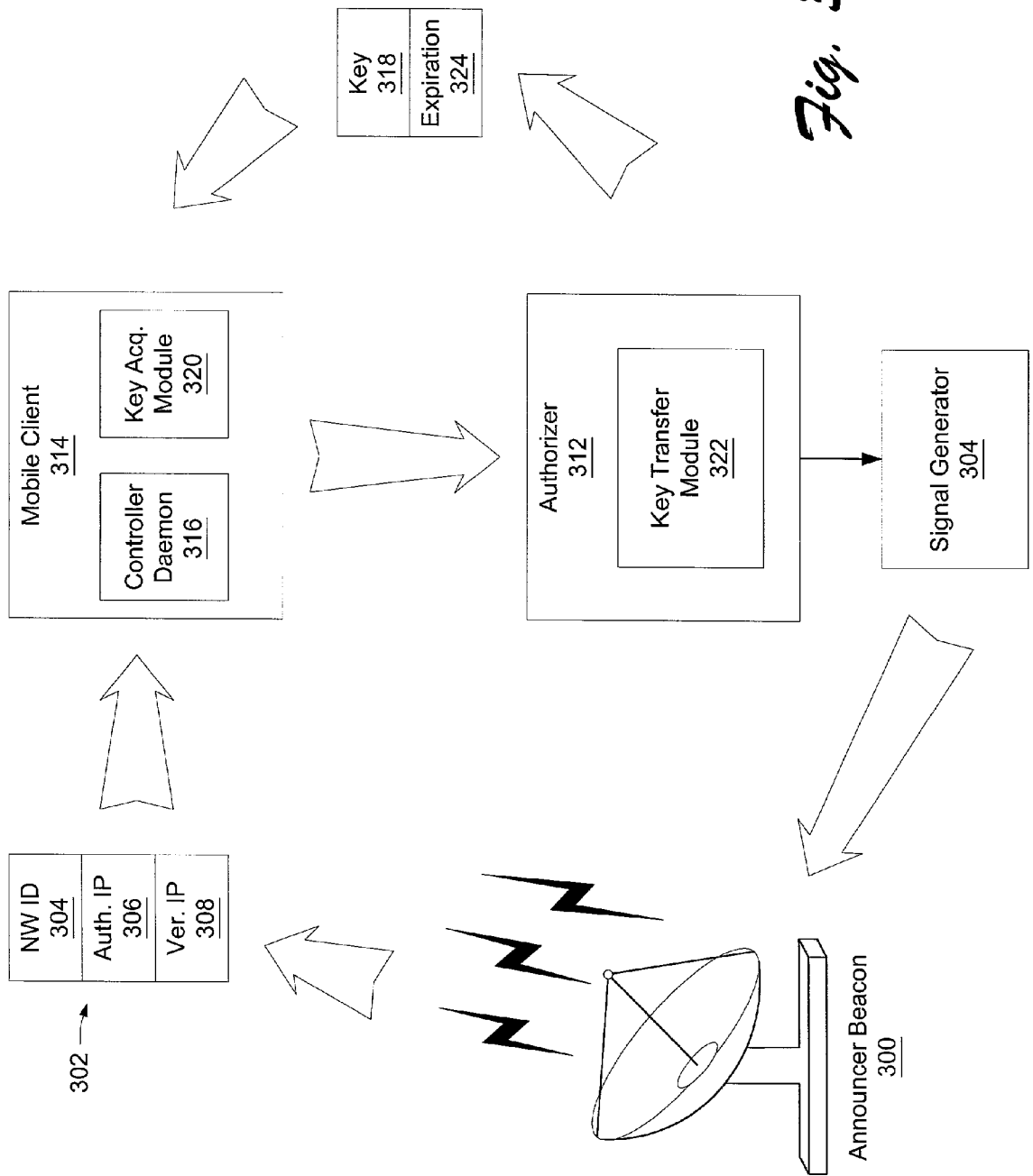
FIG. 3 is a high level diagram of process for authorizing mobile users in a wireless network.

FIG. 3 shows a high level diagram of process for authorizing mobile users in a wireless network. Although the discussion that follows is in the context of a wireless network, it is to be understood that some aspects of the system architecture could, alternately, employ a wired network.

An announcer beacon 300 broadcasts an basic announcer signal 302 generated by a signal generator 304. The announcer signal 302 includes a network identifier 306, an authorizer address 308 and a verifier address 310. The network identifier 306 identifies a host organization network (104, FIG. 1) that is broadcasting the announcer signal 302. The authorizer address 308 is an Internet address or a host organization network address for an authorizer 312. The verifier address 310 is an Internet address or a host organization network address associated with a verifier (110, FIG. 1). (The verifier 110 is not shown in FIG. 3 because the verifier is not a part of the authorization process.)

It is noted that the authorizer address 308 is given out in the announcer signal 302 before a user has been authorized. This is so that the user can access information about the host organization network 104 and have the opportunity to download network access software if the user hasn't already done so. In this way, user can walk into a building (or other wireless network coverage area), download the software and start using the network.

A mobile client 314 includes a controller daemon 316 that continuously or periodically monitors for the announcer signal 302. When the controller daemon 316 detects the announcer signal 302, the controller daemon 316 can determine the network broadcasting the announcer signal 302 and the authorizer 312 to contact to access the network identified by the network identifier 306. In the present example, authorization to access the network is demonstrated by possessing an authorization key 318.

The mobile client 314 includes a key acquisition module 320 that is configured to request the authorization key 318 from the authorizer 312. Any authorization process known in the art may be used to authorize the mobile client 314. Once the mobile client 314 is authorized, a key transfer module 322 transmits the authorization key 318 to the key acquisition module 320 of the mobile client 314.

In the present example, the authorization key 318 also includes an expiration time 324 that indicates a time period in which the authorization key 318 is valid. The expiration time 324 may be a time of expiration, a date of expiration, a time period for key validity, etc. Any known method for limiting the time during which the authorization key 318 may be used to access the network may be used. Once the mobile client 314 has obtained a valid authorization key 318, the authorization process is complete.

Verification

The verifier handles the tasks related to per-packet verification, accounting and policy enforcement on packet transmissions between the mobile users and the public network. The mobile client uses the verifier as a service gateway for access to the Internet. The verifier checks each data packet received from a mobile client for a valid tag generated by the client's authorization key. In addition, the verifier may keep an account of the number of data packets received from each user so that the information may be used to enforce policies such as quality-of-service level by dropping packets from a user who violates a service agreement.

Because the task of the authorizer and the verifier are separated, multiple verifiers may be deployed to handle large volumes of traffic flow within a wireless subnet. Additionally, verifiers may be replicated to support roaming between different wireless subnets.

Figure 4:
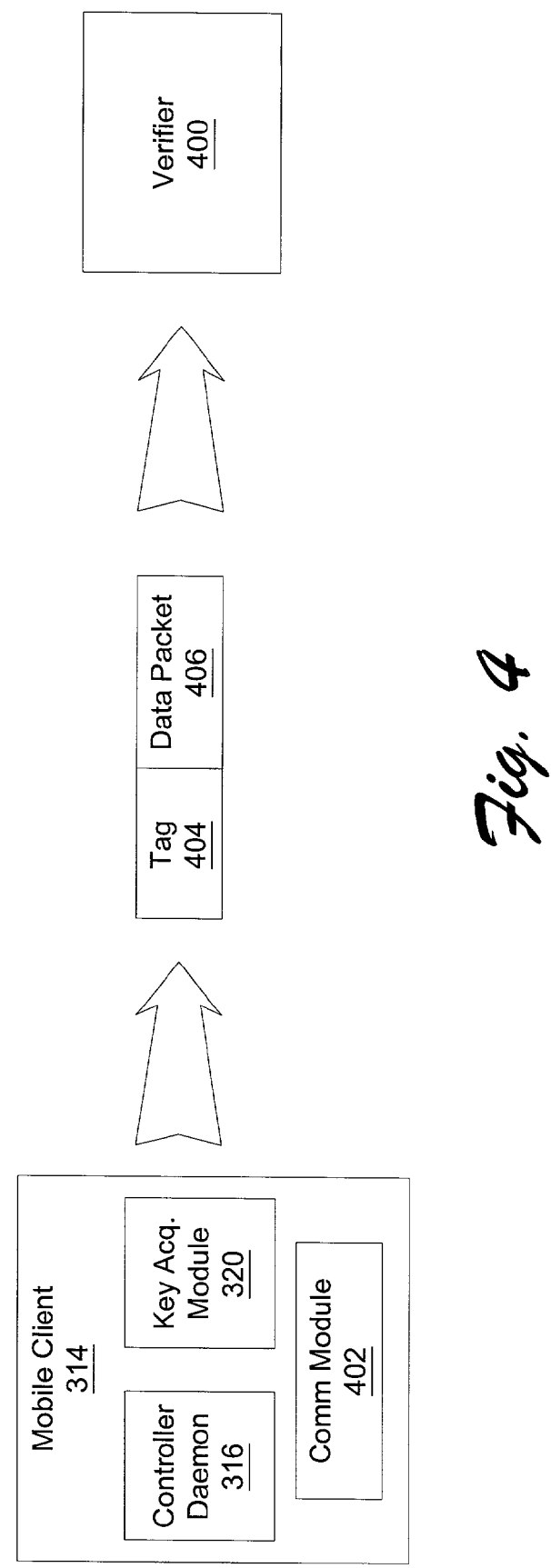
FIG. 4 is a high level diagram of a process for verifying users requesting access to a network.

FIG. 4 is a high level diagram of a process for verifying users requesting access to a network. In the discussion of FIG. 4, continuing reference will be made to the features and reference numerals recited in FIGS. 1 and 3.

Once the mobile client 314 has obtained a valid authorization key 318, the mobile client 314 is prepared to communicate with the host organization network 104 through a verifier 400. A communications module 402 in the mobile client 314 is configured to use the authorization key 318 to create a tag 404, which is appended—or integrated in some way—to a data packet 406 transmitted from the mobile client 314 to the verifier 400.

The verifier 400 is configured to verify that each data packet 406 received from the mobile client 314 includes a tag 404 generated by a valid authorization key 318. If the data packet 406 includes a tag 404 generated by a key other than the authorization key 318, the data packet 406 is dropped. Furthermore, in one implementation, if the data packet 406 includes a tag 404 that the verifier determines has expired, the verifier 400 drops the data packet 406.

Exemplary Extended Announcer Signal

FIG. 5 is a diagram of an exemplary extended announcer signal 500. The extended announcer signal 500 is similar to the announcer signal 302 shown in FIG. 3 in that it includes a network identifier 502, an authorizer address 504 and a verifier address 506. In addition, the extended announcer signal 500 includes a subnet mask 508 that identifies the particular wireless subnet (FIG. 1; 106, 108) to which a user receiving the announcer signal 500 will be connected. The subnet mask 508 is used primarily in networks having more than one subnet.

The extended announcer signal 500 includes a website Universal Resource Locator (URL) 510. When a mobile client detects the extended announcer signal 500 and connects to an authorizer identified by the authorizer address 504, the mobile client is granted limited access to the Internet (for purposes of authorization, advertisement, free services, etc.). In the present example, a mobile client connecting to the network identified by the network identifier 502 will be directed to the website URL 510 that identifies the network to the user and directs the user through the authorization process.

It is noted that the extended announcer signal 500 may contain either the subnet mask 508 or the website URL 510 or both. Furthermore, the extended announcer signal 500 may include other features that enhance a user's experience with the network.

Exemplary Tagged Data Packet

Figure 6:
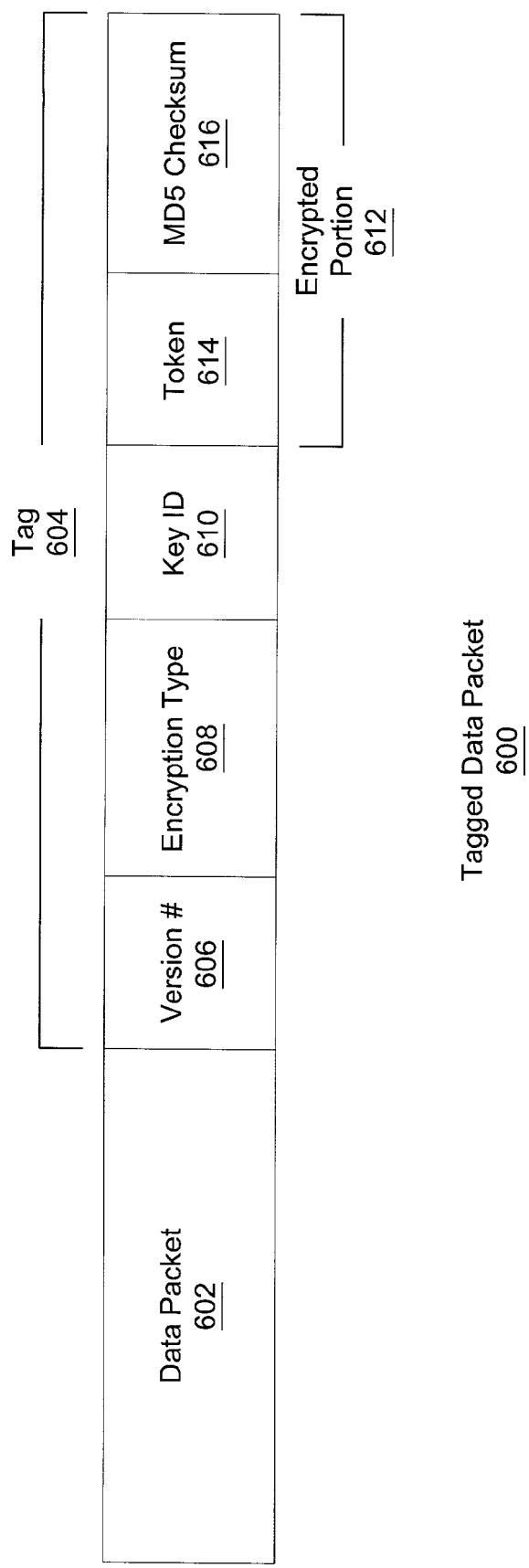
FIG. 6 is a diagram of an exemplary tagged data packet.

FIG. 6 is a diagram of an exemplary tagged data packet 600. The tagged data packet 600 includes a data packet 602 and a tag 604. It is noted that the tag 604 may comprise any data tag generated by a known method that can be used to verify that the tagged data packet 600 was sent by an authorized source. In the present example, the tag 604 includes a version number 606, an encryption type 608, a key identifier 610 and an encrypted portion 612.

The version number 606 identifies a version of the system software, i.e., the tag generation process, used to create the tagged data packet 600. The version number 606 may be used to implement backward compatibility in the event that the system protocol is revised. In such an event, a system having a later software revision can properly communicate with a system having an earlier version.

The encryption type 608 identifies the encryption algorithm—such as SSL—used to encrypt the encrypted portion 612 of the tagged data packet 600. This provides more robust security, since more than one encryption type can be used.

The key identifier 610 identifies the authorization key 318 (FIG. 3) and, as a result, identifies the client using the authorization key 318. It is noted that the authorization key 318 itself is not revealed for security reasons. But a verifier must keep track of valid keys in use in the system. When a tagged data packet is received, the verifier can map the key identifier 610 to an authorized user to verify that the user is authorized to access the network.

The encrypted portion 612 of the tag 604—in this example—includes a token 614 and a checksum 616. The token 614 is a value initially provided by the server to the mobile client. The server then knows what the token 614 should be when encrypted by the mobile client's authorization key 318. In one implementation, the token 618 is implemented as a counter that identifies a position of the data packet 600 in a sequence of data packets 600 sent from the mobile client to the verifier (e.g., if the data packet is the $256^{th}$ data packet sent from the client to the verifier in a given session, the token 618 is the value 256). If the verifier receives an out-of-sequence token 618, then the verifier knows there is a security violation.

The checksum 616 is included for data integrity verification. This prevents an unauthorized user from obtaining the tag 604 and appending the tag 604 to the unauthorized user's own data packet. Since the data packet must hash to a particular checksum value, replacing the data packet will result in a different checksum and will expose a security violation. The use of checksums is well known in the art and any checksum method compatible with the present invention may be used.

Load Balancing

Figure 7:
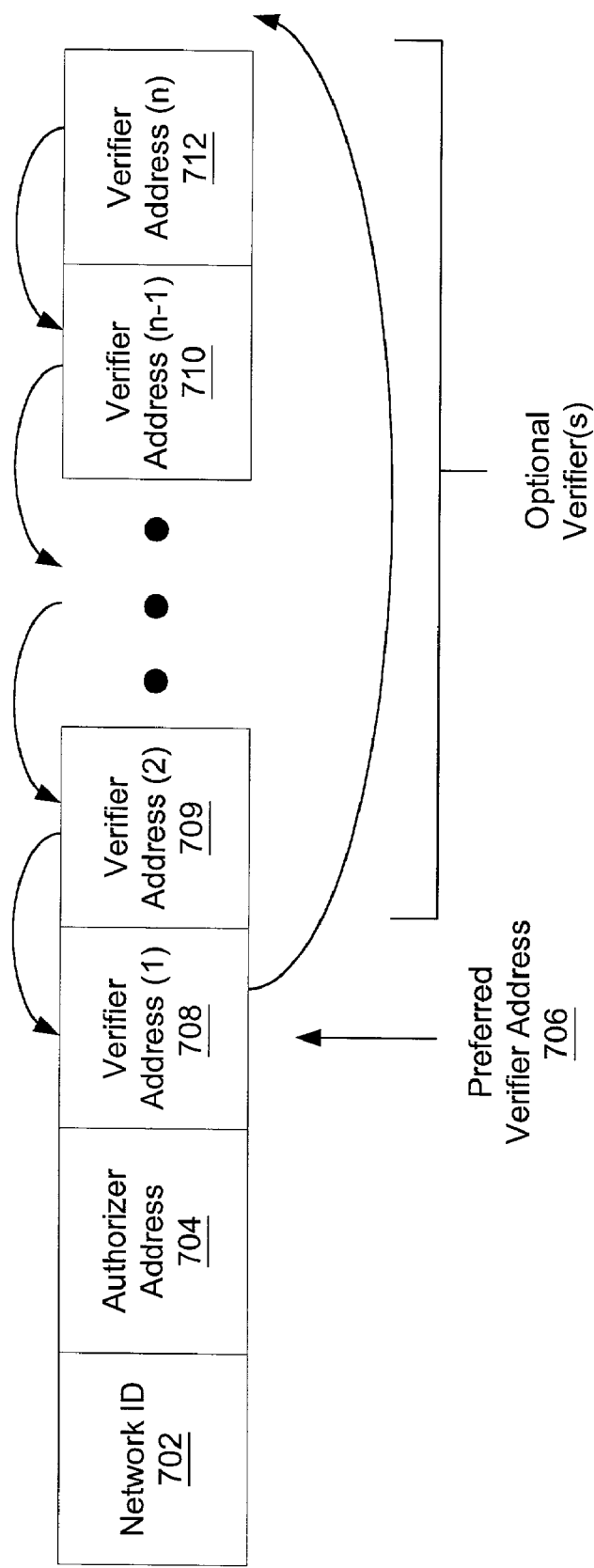
FIG. 7 is a diagram of an announcer signal that is configured to provide load balancing over multiple verifiers.

FIG. 7 is a diagram of an announcer signal 700 that is configured to provide load balancing over multiple verifiers. The announcer signal 700, as previously discussed, includes a network identifier 702 and an authorizer address 704. However, the announcer signal 700 in this situation also includes a preferred verifier address 706. The preferred verifier address 706 is a network address of a first verifier 708 that is used as described above.

In the event that the first verifier 708 bears a load at or nearing a load threshold identified for the first verifier 708, the preferred verifier address 706 is changed to identify an address of a second verifier 709. New users connecting to the network are now directed to use the second verifier 709 until the second verifier 709 attains a load at or nearing a load threshold identified for the second verifier 709. When this condition is detected, the preferred verifier address 706 is changed again to identify an address of another verifier 710, and so on until a last verifier 712 is identified as the preferred verifier address 706.

The switching of the preferred verifier address 706 is circular, so that when the last verifier 712 reaches a load threshold, the announcer signal 700 is once again changed to include a preferred verifier address 706 that identifies the address of the first verifier 708. By the time the first verifier 708 is re-identified by the preferred verifier address 706, enough users will have disconnected from the network so that new users may connect to the first verifier 708 without overloading the first verifier 708.

Fault Tolerance—Verifier Failure

Multiple verifiers may also be used to provide fault tolerance in the event of a verifier failure. When a verifier fails, the clients connected to that verifier are re-directed to another verifier. To make this operation seamless, the verifiers must be redundant, i.e., each verifier must contain a set of all active keys in the network.

Figure 8:
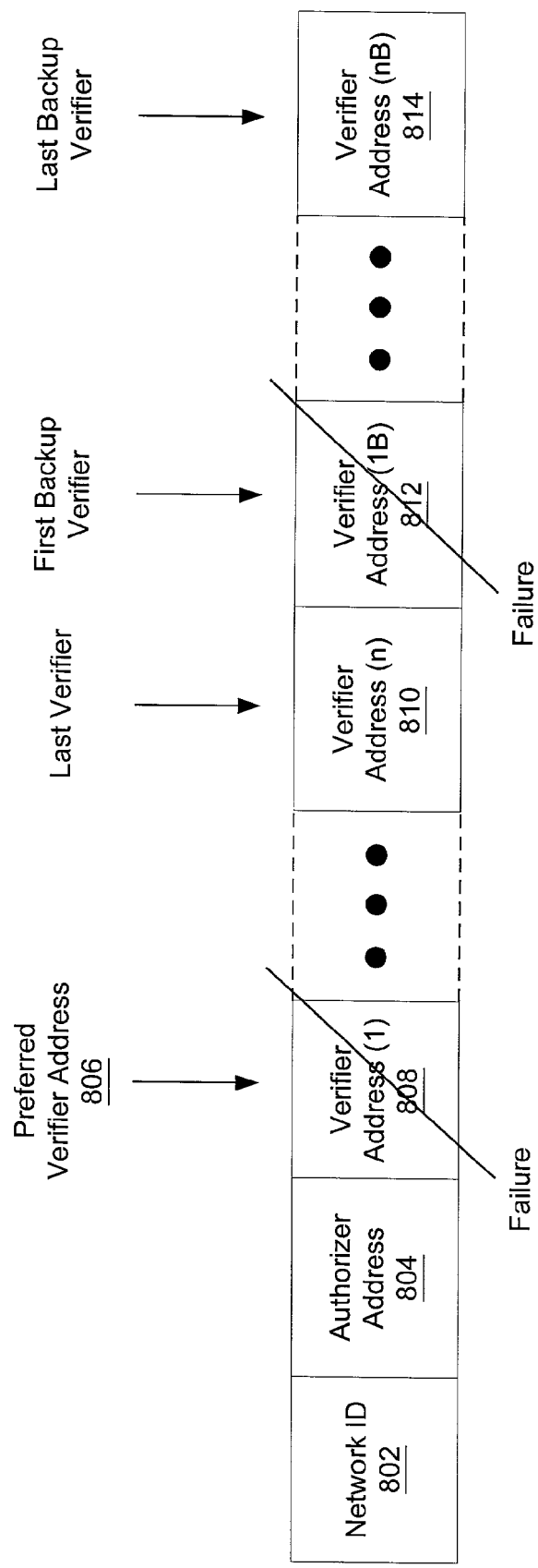
FIG. 8 is a diagram of an announcer signal that is configured to provide verifier fault tolerance.

FIG. 8 is a diagram of an announcer signal 800 that is configured to provide fault tolerance in the event that a verifier fails. An announcer signal 800 is shown having a network identifier 802 and an authorizer address 804. The announcer signal 800 also includes a preferred verifier address 806 configured in a multiple verifier scheme as outlined above with reference to load balancing. As shown, the preferred verifier address 806 is an address of a first verifier 808. Any number of verifiers may be utilized; therefore, an address of a last verifier 810 is shown as the $n^{th}$ verifier.

The first verifier 808 is assigned a first backup verifier 812. In the event that the first verifier 808 fails, an address for the first backup verifier 812 is made the preferred verifier address 806. The first backup verifier 812 may be one of the multiple verifiers in the rotation described above, i.e., an active verifier may serve as the backup verifier for another active verifier.

Each of the verifiers is assigned a backup verifier, e.g., the last verifier 810 is assigned a last backup verifier 814 (designated as the nB verifier). In this way, fault tolerance is accommodated in the event any of the verifiers fail. Upon a verifier failure, no new clients will be directed to use the failed verifier.

If the failed verifier 808 has one or more mobile clients communicating with it at the time the verifier fails, those mobile clients will receive the new announcer signal 800 that contains the address of the new preferred verifier 806. The mobile clients will immediately re-direct data packet transmissions to the new preferred verifier 806.

In another implementation, fault tolerance is handled similarly to the manner in which load balance is described above with regard to FIG. 7. In this implementation, the mobile client determines if and when the preferred verifier 806 fails. This may be accomplished by the use of a time-out mechanism or an acknowledgement mechanism, wherein the mobile client can determine when the preferred verifier 806 is not responding.

If a verifier failure is detected by the mobile client, then the mobile client re-directs data packets to the verifier address immediately following the verifier address deemed to have failed. In the present example—supposing there are only two verifiers (808 and 810), if the mobile client detects that verifier 808 is not responding, then the mobile client sends subsequent data packets to the next available verifier (in this case, verifier 810). In this way, the mobile client can continue to operate within the network in the event that a verifier fails.

Figure 9:
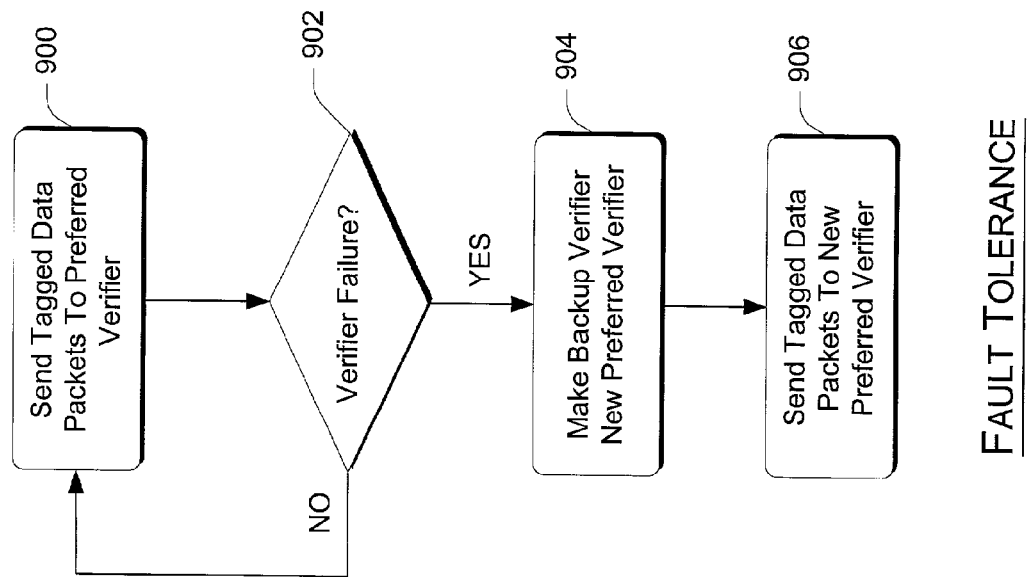
FIG. 9 is a flow diagram that depicts a method for tolerating a verifier failure.

FIG. 9 is a flow diagram that depicts a method for tolerating a verifier failure as described in the latter implementation for FIG. 8, above. At block 900, a mobile client transmits tagged data packets to the preferred verifier as previously described. The preferred verifier is the verifier identified by the verifier signal. As long as the preferred verifier is operational, the mobile client continues to send data packets to the preferred verifier ("No" branch, block 902). If the preferred verifier fails ("Yes" branch, block 902), then the mobile client changes the preferred verifier with which it communicates to a backup verifier (block 904).

The mobile client thereafter transmits tagged data packets to the new preferred verifier at block 906.

It is noted that this fault tolerance scheme may also be used with the authorizer to protect against the authorizer failing. In such a case, there is at least one backup authorizer that is utilized in the event a primary authorizer fails.

Roaming

To accommodate efficiency and mobile connectivity, mobile clients should be able to smoothly transition from one network to another, e.g., from a private network to a public network and vice-versa. In addition, a user who obtains authorization to a network and roams to another subnet in the network should not have to go through the authorization process again if the user is still in possession of a valid authorization key from the network. The following discussion addresses these issues.

Figure 10:
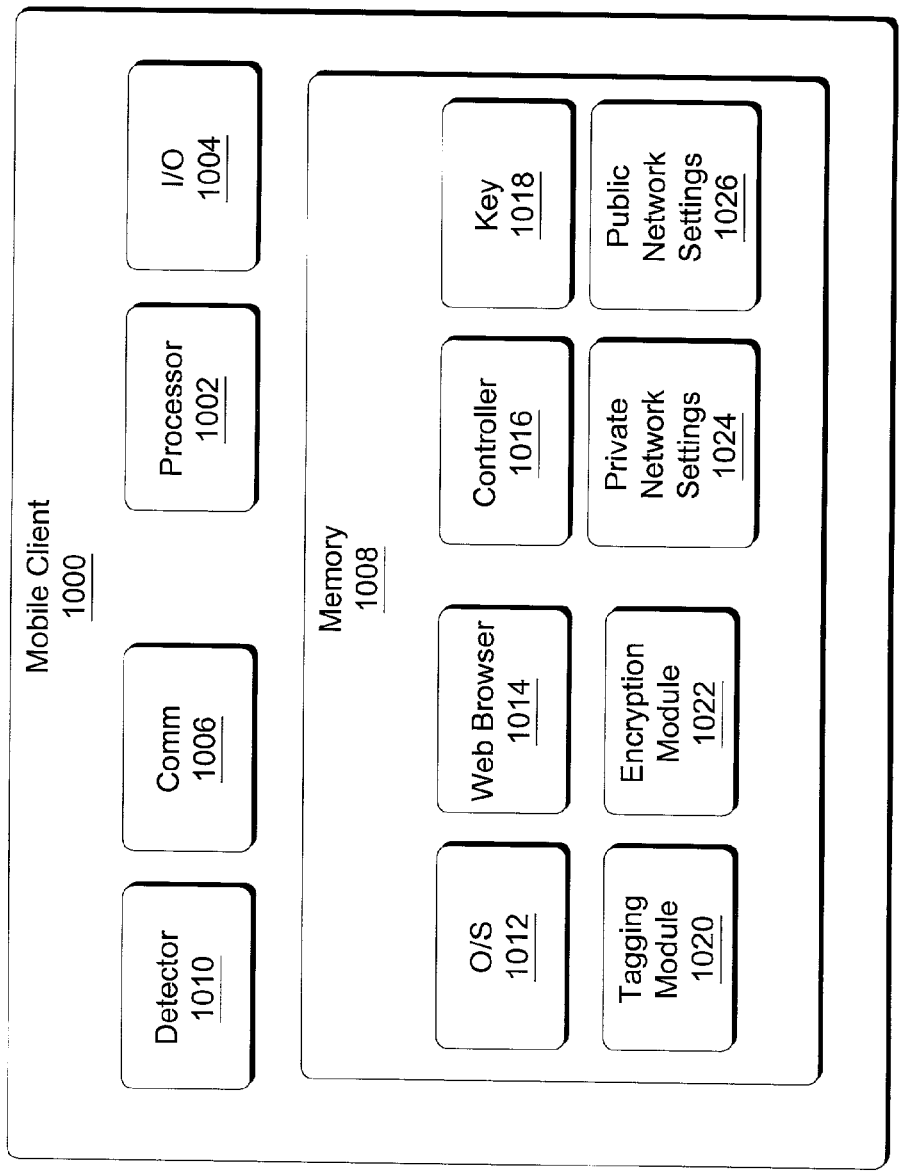
FIG. 10 is a block diagram of a mobile client.

FIG. 10 is a more detailed block diagram of a mobile client 1000 utilized in the implementations described herein. The mobile client 1000 includes a processor 1002, a display 1004, a communications module 1006 and memory 1008. The mobile client 1000 also includes a detector 1010 configured to detect an announcer signal similar to the announcer signal 302 shown in FIG. 3 and the announcer signal 500 shown in FIG. 5.

The memory 1008 includes an operating system 1012, a web browser 1014 and a controller 1016 similar to the controller daemon described above (316, FIG. 3). The memory also stores an authorization key 1018, a tagging module 1020 and an encryption module 1022, the functions of which have been discussed above.

Private network settings 1024 and public network settings 1026 are stored in the memory 1008. The private network settings 1024 are network settings for connecting to and communicating with a private network (not shown), such as a network at a user's employer. The public network settings 1026 are network settings for a public network, such as the host organization network 104 shown in FIG. 1.

FIG. 11 is a flow diagram depicting a method for accommodating mobile connectivity between networks or between subnets of a network. In the discussion of FIG. 11, continuing reference will be made to the elements and reference numerals recited in the discussion of FIG. 10. For discussion purposes, the following example deals with a mobile client that roams from a private network to a public network, disconnects from the public network then reconnects to the public network.

At block 1100, the detector 1010 of the mobile client 1000 detects an announcer signal. The controller 1016 saves private network settings 1024 (block 1102) that are used to connect to and communicate with a private network (not shown). At block 1104, the controller 1016 loads public network settings 1026 that are used by the wireless network associated with the announcer signal. Once the public network settings have been loaded, the mobile client connects with a system authorizer (block 1106) and, if authorized, communicates with the network via a vendor (block 1108).

At block 1110, the mobile client 1000 disconnects by command from a user or because the detector 1010 no longer detects the announcer signal, indicating that the mobile client 1000 has left the coverage area of the public network. Upon disconnection from the public network, the private network settings 1024 are restored on the mobile client 1000. The mobile client 1000 is then prepared to connect to and communicate with the private network to which the mobile client 1000 was previously connected.

After some time, the detector 1010 again detects an announcer signal (block 1114). For discussion purposes, it is assumed that the announcer signal is broadcast from the same public network to which the mobile client 1000 was connected previously. The private network settings 1024 are saved at block 1116 and the public network settings 1026 are loaded at block 1118. The mobile client 1000 connects with an authorizer at block 1120.

Instead of requiring the mobile client 1000 to re-authorize itself, the authorizer determines if the mobile client 1000 possesses an authorization key 1018 that is still valid. If a valid time period for using the authorization key 1018 has expired ("No" branch, block 1122), then the mobile client 1000 must be re-authorized at block 1128. If, however, the authorization key 1018 is still valid ("Yes" branch, block 1122), then the authorization key 1018 may continue to be used. Data packets are tagged at block 1124 and the tagged data packets are sent to a verifier at block 1126.

The mobile client 1000 can thus roam from the private network to the public network and back with ease, since the network settings are changed automatically. Also, if the mobile client 1000 re-connects to the network before the authorization key 1018 has expired, the user is saved the time and trouble of going through the authorization process again.

CONCLUSION

The above-described methods and systems provide a mechanism for accommodating wireless connectivity when roaming between two networks, or between two subnets of a network. A mobile user can seamlessly transition from a private network to a public network without having to manually configure the user's mobile client. The user may also disconnect and reconnect to the same network without having to go through the authorization process each time the user reconnects to the network. Implementations described herein also provide for balancing loads between multiple verifiers and providing for backup services in the event of a verifier or authorizer failure.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for broadcasting an announcement signal, comprising:
   broadcasting, via a computer network, a network identifier signal that uniquely identifies the computer network;
   broadcasting, via a computer network, an authorizer signal that identifies an authorizer network address on the computer network, the authorizer network address being associated with an authorizer that is configured to authorize mobile clients to utilize the computer network; and
   broadcasting, via a computer network, a verifier signal that identifies a verifier network address on the computer network, the verifier network address being associated with a verifier that is configured to verify data packets sent by mobile clients utilizing the computer network.

2. The method as recited in claim 1, wherein each signal is broadcast periodically.

3. The method as recited in claim 1, wherein the network identifier signal, the authorizer signal and the verifier signal are broadcast together in an announcer signal.

4. The method as recited in claim 1, wherein the authorizer network address and the verifier network address are Internet Protocol (IP) addresses.

5. The method as recited in claim 1, wherein the verifier is preferred verifier, and the method further comprises substituting a network address of an alternate verifier for the network address of the preferred verifier.

6. The method as recited in claim 5, further comprising determining if the preferred verifier has reached a load threshold, and wherein the substituting is performed if the load threshold is reached.

7. The method as recited in claim 5, further comprising detecting a preferred verifier failure, and wherein the substituting is performed if the preferred verifier fails.

8. A system comprising:
   a computer network;
   a computing device configured as an authorizer;
   a computing device configured as a verifier;
   a signal generator that generates at least one signal for communication, the at least one signal comprising of:
      a network identifier signal that identifies the computer network;
      an authorizer signal that identifies an authorizer network address on the computer network, the authorizer network address associated with the authorizer that is configured to authorize mobile clients to utilize the computer network; and
      a verifier signal that identifies a verifier signal that identifies a verifier network address on the computer network, the verifier network address associated with the verifier that is configured to verify data packets sent by the mobile clients utilizing the computer network.

9. The system as recited in claim 8, wherein the at least one signal is broadcast periodically.

10. The system as recited in claim 8, wherein the network identifier signal, the authorizer signal and the verifier signal are broadcast simultaneously in an announcer signal.

11. The system as recited in claim 8, wherein the authorizer network address and the verifier address are Internet Protocol addresses.

12. The system as recited in claim 8, wherein the verifier is a preferred verifier, and the system further comprises substituting a network address of an alternate verifier for the network address of the preferred verifier.

13. The system as recited in claim 12, wherein the substituting occurs when the preferred verifier has reached a load threshold, the load threshold being the highest rate of use that is acceptable for the preferred verifier.

14. The system as recited in claim 12, wherein the substituting occurs when detecting a preferred verifier failure.

15. A computer-readable storage medium comprising instructions stored thereon that direct one or more computers to perform operations including:
   broadcasting a network identifier signal that uniquely identifies a computer network;
   broadcasting an authorizer signal that identifies an authorizer network address on the computer network, the authorizer network address being associated with an authorizer that is configured to authorize mobile clients to utilize the computer network; and
   broadcasting a verifier signal that identifies a verifier network address on the computer network, the verifier network address being associated with a verifier that is configured to verify data packets sent by mobile clients utilizing the computer network.

16. The computer-readable storage medium recited in claim 15, wherein each signal is broadcast periodically.

17. The computer-readable storage medium recited in claim 15, wherein the network identifier signal, the authorizer signal and the verifier signal are broadcast together in an announcer signal.

18. The computer-readable storage medium recited in claim 15, wherein one or both of the authorizer network address and the verifier network address are Internet Protocol addresses.

19. The computer-readable storage medium recited in claim 15, wherein the verifier is a preferred verifier and the operations further comprise substituting a network address of an alternate verifier for the network address of the preferred verifier.

20. The computer-readable storage medium recited in claim 19, further comprising determining when the preferred verifier has reached a load threshold, and wherein the substituting is preformed when the load threshold is reached.

21. The computer-readable storage medium recited in claim 19, further comprising detecting a preferred verifier failure, and wherein the substituting is performed when the preferred verifier fails.

\* \* \* \* \*

UNITED STATES PATENT AND TRADEMARK OFFICE
CERTIFICATE OF CORRECTION

| | |
|---|---|
| PATENT NO. | : 8,041,815 B2 |
| APPLICATION NO. | : 09/960258 |
| DATED | : October 18, 2011 |
| INVENTOR(S) | : Paramvir Bahl et al. |

It is certified that error appears in the above-identified patent and that said Letters Patent is hereby corrected as shown below:

In column 8, line 52, before "user can" insert -- a --.

In column 14, line 6, in Claim 1, delete "a" and insert -- the --, therefor.

In column 14, line 10, in Claim 1, delete "via a" and insert -- via the --, therefor.

Signed and Sealed this
Sixth Day of December, 2011

David J. Kappos
*Director of the United States Patent and Trademark Office*